(12) United States Patent
Shiozawa

(10) Patent No.: US 8,194,523 B2
(45) Date of Patent: Jun. 5, 2012

(54) OPTICAL DISC APPARATUS AND OPTICAL DISC REPRODUCING METHOD

(75) Inventor: Manabu Shiozawa, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 12/785,514

(22) Filed: May 24, 2010

(65) Prior Publication Data

US 2011/0044142 A1 Feb. 24, 2011

(30) Foreign Application Priority Data

Aug. 24, 2009 (JP) ................. 2009-192721

(51) Int. Cl.
*G11B 7/00* (2006.01)
(52) U.S. Cl. ............ 369/116; 369/47.5; 369/53.26; 369/112.05
(58) Field of Classification Search ........... 369/44.27, 369/44.23, 44.37, 44.38, 112.02, 112.05, 369/116, 47.5, 53.26, 53.27
See application file for complete search history.

(56) References Cited

U.S. PATENT DOCUMENTS

| | | | |
|---|---|---|---|
| 4,462,095 A * | 7/1984 | Chen | 369/44.38 |
| 5,210,627 A * | 5/1993 | Toide et al. | 369/112.04 |
| 7,016,271 B2 * | 3/2006 | Kobori | 369/44.37 |
| 7,852,726 B2 * | 12/2010 | Yanagawa et al. | 369/53.22 |
| 2002/0027840 A1 * | 3/2002 | Morishita et al. | 369/112.02 |
| 2003/0169667 A1 | 9/2003 | Nishi et al. | |
| 2006/0164955 A1 * | 7/2006 | Nishi et al. | 369/112.01 |
| 2009/0231984 A1 * | 9/2009 | Hotta et al. | 369/112.23 |

FOREIGN PATENT DOCUMENTS

| | | |
|---|---|---|
| CN | 1424718 | 6/2003 |
| JP | 8-30989 | 2/1996 |

OTHER PUBLICATIONS

Office Action issued in Chinese Patent Application No. 2012010900606840 on Jan. 12, 2012.

* cited by examiner

*Primary Examiner* — Thang Tran
(74) *Attorney, Agent, or Firm* — Antonelli, Terry, Stout & Kraus, LLP.

(57) ABSTRACT

An optical disc apparatus includes a light source for emitting laser light, a light source drive unit for driving said light source, an optical element for splitting the laser light into a plurality of light fluxes, an optical element drive unit for controlling the optical element, an element for focusing the laser light onto the optical disc, and a detection unit for detecting the laser light reflected by the optical disc. Reproduction of the optical disc is performed by switching effectiveness and ineffectiveness of a function of splitting the light flux of the optical element, and adjustment of an outgoing laser power is performed.

5 Claims, 4 Drawing Sheets

OPTICAL DISC APPARATUS AND OPTICAL DISC REPRODUCING METHOD

INCORPORATION BY REFERENCE

The present application claims priority from Japanese application JP-2009-192721 filed on Aug. 24, 2009, the content of which is hereby incorporated by reference into this application.

BACKGROUND OF THE INVENTION

The present invention relates to an optical disc apparatus for reproducing an optical disc using laser light.

As background technology, for example, there is technology disclosed in JP-A-8-30989. In JP-A-8-30989, it is disclosed a method where "a tracking error signal by a push-pull method is selected in tracking-servo leading-in", and "tracking control is performed based on tracking error signals by a three-beam method after servo leading-in".

SUMMARY OF THE INVENTION

In reproducing an optical disc, as a method for making a light spot following a track on the optical disc, there have been used a DPP (differential Push-Pull) method or a three-beam method. The DPP method is a method for splitting laser light to a main beam (light flux) and sub-beams using a diffraction grating, and generating a main push-pull signal by the main beam, and a sub-push-pull signal by the sub-beams. By multiplying the sub-push-pull signal by a coefficient to compensate sensitivity for a lens shift, and using a signal subtracted from the main push-pull signal as the tracking error signal, an offset caused by the lens shift can be compensated, and the light spot can be made to follow the center of a track. The three-beam method is a method for splitting the laser light to the main beam and the sub-beams by using the diffraction grating, in which an intensity change of the signal generated by the sub-beams is used as the tracking error signal.

In the DPP method or the three-beam method, the main beam is used for recording and reproduction, and the sub-beams are used only for tracking servo. Because the power control of the laser light is performed for laser light usually before the beam splitting, when a light intensity ratio of the main beam and the sub-beams differs from a designed value, there is a problem of deterioration of recording and reproduction performance. That is, when the light intensity of the main beam is high, signals which have been recorded in a disc could be deteriorated, while in the case of low light intensity, the deterioration of reproduction performance is generated by a decrease in signal amplitude. Such deviation from the designed value is caused by a variation of the characteristics of the diffraction grating, or the like.

It is an object of the present invention to provide an optical disc apparatus or an optical disc reproducing method, which is capable of compensating the variation of the light intensity ratio of the main beam and the sub-beams.

The above object can be achieved, as one example, by the invention described in the appended claims.

According to the present invention, it is possible to compensate the variation of light intensity ratio of the main beam and the sub-beams, and obtain reproduction performance according to a designed value.

Other objects, features and advantages of the invention will become apparent from the following description of the embodiments of the invention taken in conjunction with the accompanying drawings.

DETAILED DESCRIPTION OF THE EMBODIMENTS

Explanation will be given below on embodiments of the present invention with reference to drawings.

It should be noted that, "outgoing power" hereafter represents the power of laser light outwent from an objective lens. In addition, "emission power" represents the power of laser light which a laser diode emits.

EXAMPLE 1

Figure 1A:
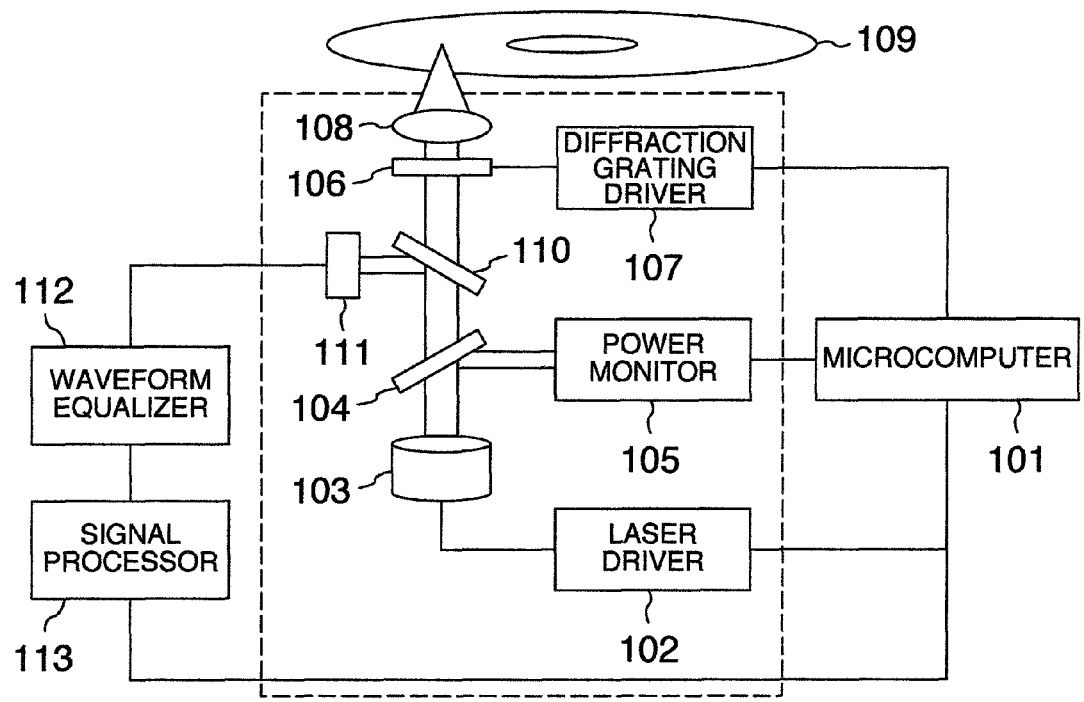
FIG. 1A is a block configuration diagram representing one embodiment of an optical disc apparatus according to the present invention.

FIG. 1A is a block configuration diagram showing one embodiment of an optical disc apparatus according to the present invention. Here, descriptions on blocks not participating directly to the present embodiment were omitted.

A microcomputer 101 performs communication with a host apparatus such as a PC through an interface such as ATAPI not shown. In addition, the microcomputer 101 performs emission control for a laser driver 102, and the laser driver 102 outputs current to drive a laser diode 103 corresponding to a control of the microcomputer 101. The laser diode 103 emits an emission power corresponding to a drive current of the laser driver 102. A power monitor 105 detects an emission power of the laser diode 103 via a beam splitter 104, converts the detected power to a voltage value, and outputs it to the microcomputer 101. The emission power detected here is a total light intensity before splitting the laser light using a diffraction grating 106. The diffraction grating 106 switches the laser light to one beam and three beams corresponding to a control of a diffraction grating driver 107. As a method for switching the one beam and the three beams, for example, it is considered a method for inserting and pulling out the diffraction grating 106 in a laser light path. An element to switch the laser light to the one beam and the three-beams is not especially limited to by the inserting and pulling out the diffraction grating mechanically in this way, but the laser light may be switched to the one beam and the three-beams by switching characteristics of an optical element by an optical element or an electrical element. An objective lens 108 focuses the laser light onto an optical disc 109.

The laser light reflected at the optical disc 109 retains disc information as a light intensity. In performing reproduction, the laser light is reflected by a polarizing beam splitter 110, and focused onto the detector 111. The detector 111 detects the laser light focused, and outputs a signal corresponding to the intensity of the laser light to a waveform equalizer 112. The waveform equalizer 112 performs a processing such as equalization, amplification for a signal waveform detected by the detector 111, and outputs the signal waveform to a signal processor 113. The signal processor 113 performs a signal processing such as analogue/digital conversion, equalization, and decoding, for the signal waveform output by the waveform equalizer 112, and outputs a data thus decoded to the microcomputer 101.

In an example of FIG. 1A, blocks 102 to 108, 110 and 111 within a frame indicated by a dotted line shall be mounted on an optical pickup. It should be noted that, although FIG. 1A showed an example of mounting the laser diode 103 and the power monitor 105 in a separated way, a power monitor may be packaged, and a laser diode which outputs the detected power to the microcomputer 101 may be used. In addition, in the present specification, an example of controlling the diffraction grating 106 by the diffraction grating driver 107 was shown, however, the diffraction grating 106 may be driven by the microcomputer 101 without using the diffraction grating driver 107. In addition, although an example of the diffraction grating 106 was shown as an element to split the laser light, however, the laser light may be split using a liquid crystal element or the like.

Figure 1B:
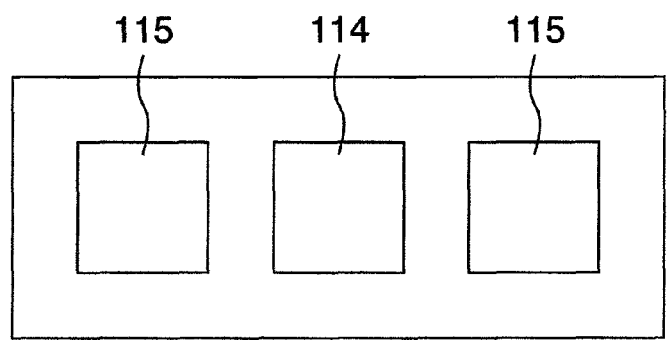
FIG. 1B is a configuration diagram of a detector of an optical disc apparatus according to the present invention.

FIG. 1B is an example representing the detector 111 in detail. The detector 111 is provided with a main detector 114 which receives reflected light of the main beam, and a sub-detector 115 which receives reflected light of the sub-beams.

Figure 2A:
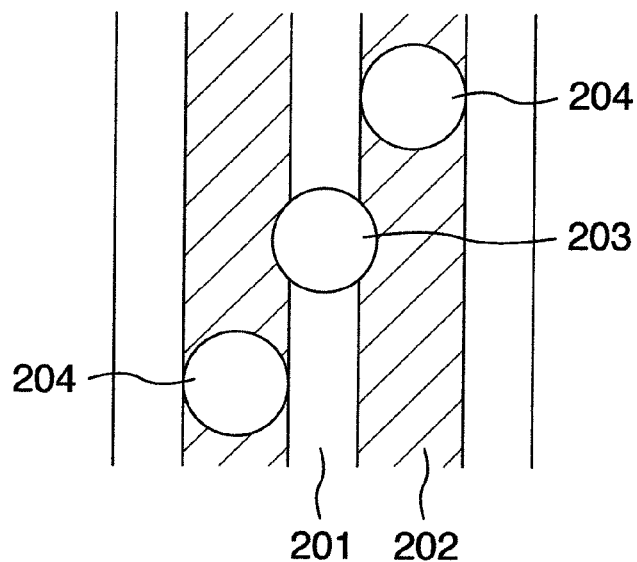
FIG. 2A is an example of a schematic view of a light spot on a recording-type optical disc.

FIG. 2A shows a schematic view of a light spot focused onto an optical disc when the function of the diffraction grating was made effective. On the optical disc, a groove 201 and a land 202 are engraved, and they function as guides to make the optical spot followed. 203 and 204 each represents the optical spot of the main beam and the sub-beams split using the diffraction grating, and the light intensity ratio of both is typically about 15:1. Reflected light of the main beam is received at the main detector 114 of FIG. 1B, and reflected light of the sub-beams is received at the sub-detector 115. Because a reproduced signal is generated only at the main-detector 114, when the light intensity ratio of the main beam to the sub-beams is smaller than a designed value, reduction of reproduction performance is incurred. On the other hand, when the light intensity ratio of the main beam is higher than a designed value, data which has been recorded on the optical disc could be erased. The sub-detector generates a sub-push-pull signal in the case of the DPP method, and in the case of the three-beam method, it generates a tracking error signal. Because only one beam outwent from the objective lens, when the function of the diffraction grating was made ineffective, only the spot 203 by the main beam is light-focused on the optical disc.

Here, although an example in which data is recorded in the groove 201 was shown in the present specification, it may be recorded in the land 202, or it may be recorded in both of the groove and the land.

Figure 2B:
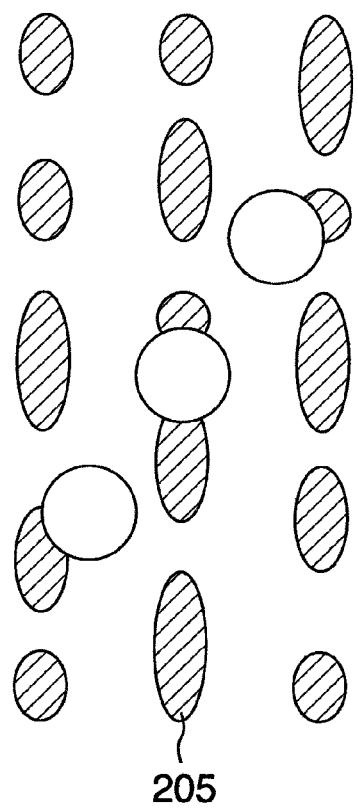
FIG. 2B is an example of a schematic view of a light spot on a reproduction exclusive optical disc.

In addition, although FIG. 2A represented an example of a recording-type optical disc, in the case of a read-only compact disc, pits 205 function as a guide as represented in FIG. 2B.

Figure 3:
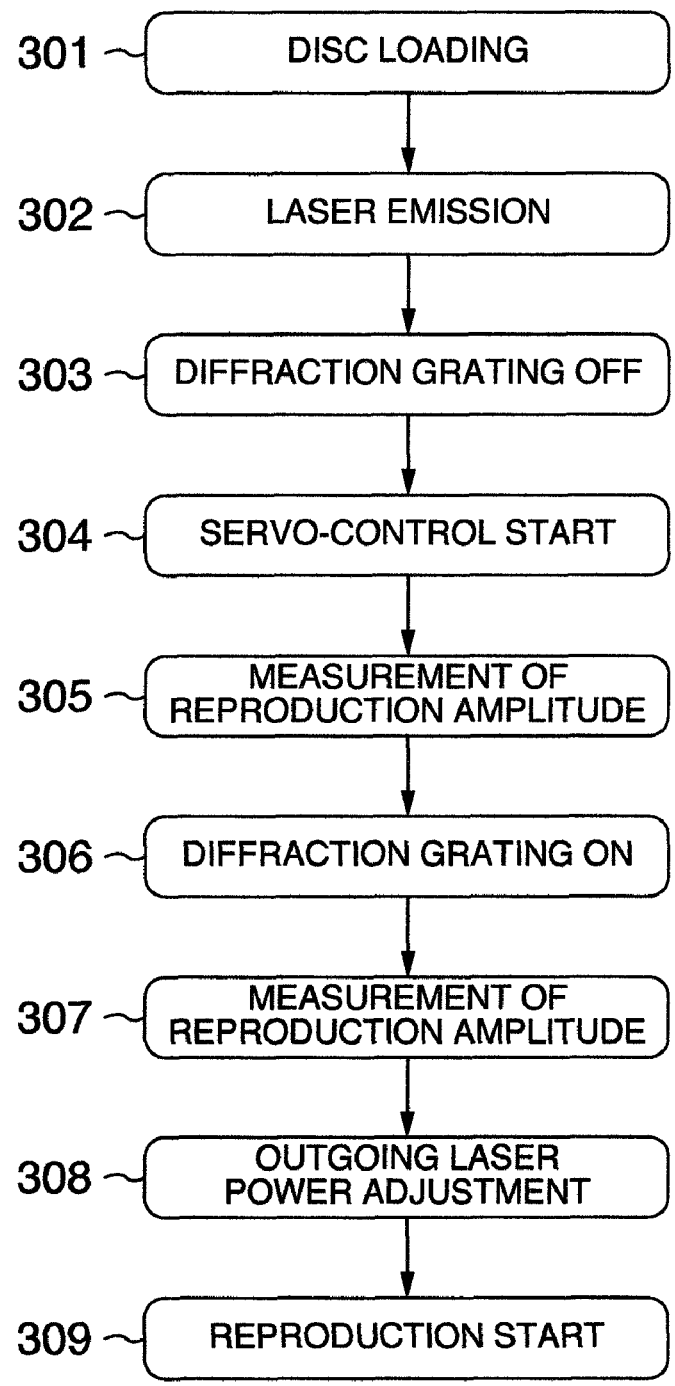
FIG. 3 is an example of a flow chart from inserting an optical disc into an optical disc apparatus according to the present invention to starting reproduction.

FIG. 3 represents an example of a flow chart from inserting an optical disc into the optical disc apparatus according to the present invention to starting reproduction. Here, descriptions on actions not directly participating to the present embodiment were omitted.

In a step 301, a disc is loaded. In a step 302, laser light is emitted. In a step 303, the function of the diffraction grating is made ineffective, and one beam outgoes from the objective lens. The outgoing power in this case can be adjusted to a desired power of, for example, 0.3 mW or the like, by monitoring with the power monitor 105 in FIG. 1A. After starting servo-control such as focus or tracking in a step 304, an amplitude of a reproduced signal is measured in a step 305. In a step 306, the function of the diffraction grating is made effective to form the three beams. In a step 307, the reproduced signal amplitude is measured, while maintaining the emission power of the laser in the step 302 as it is. By comparing the reproduced signal amplitude in this case and the reproduced signal amplitude measured in the step 305, the light intensity ratio of the main beam and the sub-beams can be obtained. For example, when the reproduced signal amplitude measured in the step 305 was 300 mV, and the reproduced signal amplitude measured in the step 307 was 250 mV, it is understood that the light intensity ratio of the main beam and the sub-beams (sub:main:sub) is 1:10:1. In a step 308, the outgoing power of the laser light is adjusted, based on the light intensity ratio thus obtained. As described above, when the light intensity ratio of the main beam and the sub-beams is 1:10:1, for example, in order to outgo the main beam at an intensity of 0.3 mW, the total outgoing power may be adjusted so as to be 0.36 mW. After performing the above adjustment, reproduction is started in a step 309. Here, a place for measuring the reproduced signal amplitude may be a user data region, or may be a place where a signal for test has been recorded in advance such as an OPC region or a pre-write region.

As described above, the light intensity ratio of the main beam and the sub-beams can be obtained by switching the function of effective-ineffective of the diffraction grating and reproduction at the desired reproduction power is possible, so that the quality or the reliability of reproduction can be improved.

In addition, a data reproduced by switching the one beam and the three beams may be a user data in the user data region, or may be a data in a trial writing region used in the adjustment of the recording power or the like.

Figure 4:
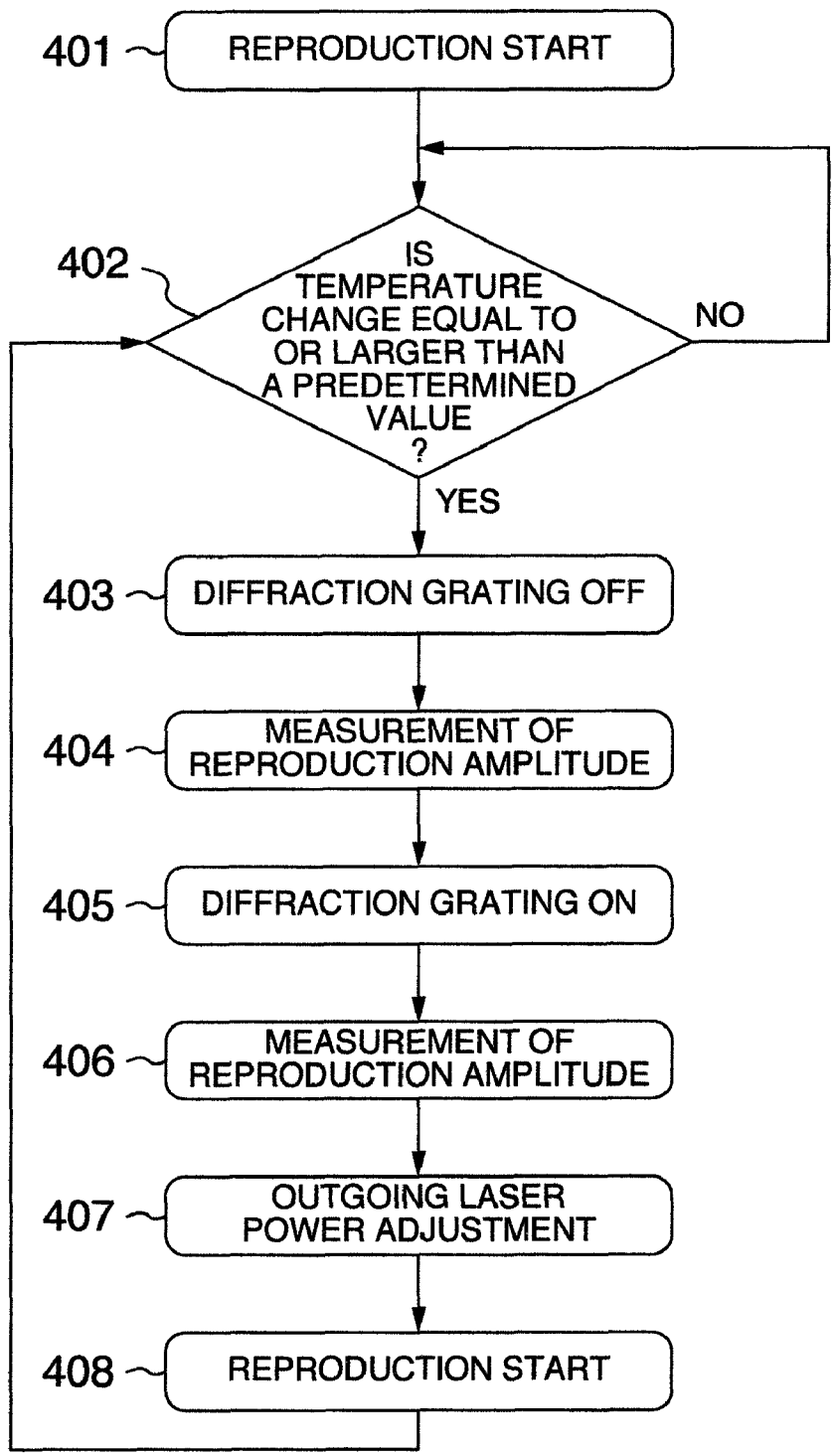
FIG. 4 is an example of a flow chart representing actions of an optical disc apparatus according to the present invention, when temperature varies from starting of reproduction.

FIG. 4 shows an example of a flow chart representing actions of the optical disc apparatus according to the present invention, when temperature varies from starting reproduction.

In a step 401, reproduction is started. In a step 402, an internal temperature of the optical disc apparatus is measured, for example, with a sensor installed inside a drive, or a sensor installed at the optical pickup. A specific portion for measuring the temperature comprises the peripherals of an element with high temperature dependency, such as the laser diode, the diffraction grating, the liquid crystal element. When the temperature measured in the step 402 has changed equal to or more than a specified value of temperature measured at the previous measurement time, the diffraction grating is made ineffective in a step 403, and the reproduced signal amplitude is measured in a step 404. In a step 405, the diffraction grating is made effective, and the reproduced signal amplitude is measured in a step 406. By comparing the reproduced signal amplitude in this case and the reproduced signal amplitude measured in the step 404, a light intensity ratio of the main beam and the sub-beams can be obtained. In a step 407, outgoing power of the laser light is adjusted, based on the light intensity ratio obtained, and the reproduction is started in a step 408. For the measurement of the reproduced signal amplitude, the user data region may be used, or it may be performed by transferring it to a place where a signal for testing has been recorded in advance, such as the OPC region, or the pre-write region. In addition, before making the diffraction grating ineffective in the step 403, the emission power of the laser diode may be decreased to a predetermined value. This is because of the prevention of deterioration of the signal recorded in the disc due to an increased outgoing power by outgoing in one beam.

Although, in the present specification, an example of adjusting the outgoing laser power when the temperature changed was shown, the adjustment may be performed also when the action was changed from recording to reproduction. This is because the recording is considered to increase the temperature of the laser diode and change the emission characteristics.

It should be noted that, the present invention should not be limited to the above embodiments, and should contain various modified embodiments. For example, the above embodiments are those for explaining the invention in detail so as to explain the present invention for easy-understanding, and therefore, the present invention should not necessarily be limited to the one provided with all configurations explained. In addition, it is possible to substitute a part of a configuration of a certain embodiment with a configuration of other embodiment, and it is also possible to add a configuration of other embodiment to a configuration of a certain embodiment. In addition, it is possible to add, delete or substitute other configurations for a part of a configuration of each embodiment.

The invention claimed is:

1. An optical disc apparatus for reproducing information from an optical disc, comprising:
   a light source for emitting laser light;
   a light source drive unit for driving said light source;
   an optical element having a function of splitting said laser light into a plurality of light beams; wherein, when said function of splitting is made effective, said laser light is split into one main beam and a plurality of sub-beams, and when said function of splitting is made ineffective, said laser light is not split and only the main beam remains;
   an optical element control unit for controlling whether to make said function of splitting of said optical element effective or ineffective;
   a focusing means for focusing the main beam and the plurality of sub-beams onto said optical disc; and
   a detection unit for detecting said main beam reflected by said optical disc;
   wherein, adjustment of a power of the main beam emitted from said focusing means is performed by emission power control of said light source drive unit to said light source, based on an amplitude of a reproduced signal obtained by said detection unit when the optical disc is reproduced by irradiating the main beam onto the optical disc, under control of said optical element control unit and under a condition that said function of splitting is made ineffective, and an amplitude of a reproduced signal obtained by said detection unit when the optical disc is reproduced by irradiating the main beam and the plurality of sub-beams onto the optical disc, under control of said optical element control unit and under a condition that the function of spitting is made effective.

2. The optical disc apparatus according to claim 1, further comprising:
   a temperature sensor for measuring temperature of said optical disc apparatus,
   wherein, a change of temperature is monitored by said temperature sensor, and when the temperature changed to equal or more than a specified value of temperature, said adjustment of the power of the main beam is performed.

3. An optical disc reproducing method for performing reproduction of an optical disc in an optical disc apparatus having an optical element having a function of splitting laser light into a plurality of light beams; wherein, when said function of splitting is made effective, said laser light is split into one main beam and a plurality of sub-beams, and when said function of splitting is made ineffective, said laser light is not split and only the main beam remains;
   the method comprising steps of:
   a step of obtaining an amplitude of a reproduced signal when the optical disc is reproduced by irradiating the main beam onto the optical disc under a condition that said function of splitting is made ineffective;
   a step of obtaining an amplitude of a reproduced signal when the optical disc is reproduced by irradiating the main beam and the plurality of sub-beams onto the optical disc under a condition that said function of splitting is made effective; and
   a step of adjusting a laser power based on the amplitude of the reproduced signal obtained under the condition that said function of splitting is made ineffective and the amplitude of the reproduced signal obtained under the condition that said function of splitting is made effective.

4. The optical disc reproducing method according to claim 3, the method comprising steps of:
   a step of monitoring a temperature change of the optical disc apparatus; and
   a step of judging whether said step of adjusting is performed or not when a temperature change equal to or more than a specified value of temperature is detected in said step of monitoring.

5. An optical disc reproducing method for reproducing information by irradiating laser light onto an optical disc, comprising:
   a first reproducing step for performing reproduction of said optical disc by irradiating a main beam onto said optical disc;
   a second reproducing step for performing reproduction of said optical disc by splitting light flux of said laser light to the main beam and two sub-beams; and
   a power adjustment step for performing adjustment of an outgoing power of reproduction laser, based on results of reproduced signal amplitudes obtained in said first reproducing step and said second reproducing step.

* * * * *